(12) United States Patent
Fujii et al.

(10) Patent No.: US 10,112,469 B2
(45) Date of Patent: Oct. 30, 2018

(54) ELECTRIC WORK VEHICLE

(71) Applicant: Kubota Corporation, Osaka-shi (JP)

(72) Inventors: Yuto Fujii, Sakai (JP); Hirokazu Ito, Sakai (JP); Kazuo Koike, Sakai (JP)

(73) Assignee: Kubota Corporation, Osaka (JP)

( * ) Notice: Subject to any disclaimer, the term of this patent is extended or adjusted under 35 U.S.C. 154(b) by 15 days.

(21) Appl. No.: 15/172,477

(22) Filed: Jun. 3, 2016

(65) Prior Publication Data

US 2017/0055443 A1    Mar. 2, 2017

(30) Foreign Application Priority Data

Aug. 28, 2015  (JP) .................................. 2015-169466

(51) Int. Cl.
| | |
|---|---|
| B60K 1/02 | (2006.01) |
| A01D 34/66 | (2006.01) |
| B60K 1/04 | (2006.01) |
| A01D 69/02 | (2006.01) |
| B60K 7/00 | (2006.01) |
| B60K 17/04 | (2006.01) |

(52) U.S. Cl.
CPC ................ *B60K 1/02* (2013.01); *A01D 34/66* (2013.01); *A01D 69/02* (2013.01); *B60K 1/04* (2013.01); *B60K 7/0007* (2013.01); *B60K 17/043* (2013.01); *B60K 2001/0416* (2013.01); *B60K 2007/0061* (2013.01); *B60Y 2200/223* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 5,388,659 A | * | 2/1995 | Pepe ..................... | B62K 3/002 |
| | | | | 180/208 |
| 2009/0000839 A1 | * | 1/2009 | Ishii ....................... | A01D 34/64 |
| | | | | 180/65.51 |
| 2012/0095636 A1 | | 4/2012 | Ishii et al. | |
| 2012/0159916 A1 | | 6/2012 | Ishii et al. | |
| 2014/0059989 A1 | | 3/2014 | Ishii et al. | |
| 2016/0029555 A1 | | 2/2016 | Ishii et al. | |

FOREIGN PATENT DOCUMENTS

| | | |
|---|---|---|
| JP | 2008168869 A | 7/2008 |
| JP | 201321987 A | 2/2013 |
| WO | 2013015171 A1 | 1/2013 |

* cited by examiner

*Primary Examiner* — John D Walters
*Assistant Examiner* — Hilary L Johns
(74) *Attorney, Agent, or Firm* — The Webb Law Firm

(57) ABSTRACT

An electric work vehicle includes a left frame and a right frame extending in a vehicle fore/aft direction, a battery assembly mounted between the left frame and the right frame, a left rear wheel mounted outward of the left frame in a vehicle lateral direction, a right rear wheel mounted outward of the right frame in the vehicle lateral direction, a left motor mounted outward of the left frame in the vehicle lateral direction and forward of an axis of the left rear wheel for transmitting rotary driving power to the left rear wheel, and a right motor mounted outward of the right frame in the vehicle lateral direction and forward of an axis of the right rear wheel for transmitting rotary driving power to the right rear wheel.

18 Claims, 6 Drawing Sheets

ELECTRIC WORK VEHICLE

CROSS-REFERENCE TO RELATED APPLICATION

This application claims priority to Japanese Patent Application No. 2015-169466 filed Aug. 28, 2015, the disclosure of which is hereby incorporated in its entirety by reference.

BACKGROUND OF THE INVENTION

1. Field of the Invention

The present invention relates to an electric work vehicle including right and left motors, which are charged and powered by a battery, in which the right motor drives a right rear wheel and the left motor drives a left rear wheel to propel the vehicle in operation.

2. Description of the Related Art

A conventional lawn mower is disclosed in WO 2013/015171 A1 (FIGS. 1 and 2). This lawn mower includes a pair of right and left rear wheels driven independently of each other by a pair of right and left motors, respectively. The right and left rear wheels are supported by a rear axle casing extending between the rear wheels. A gear casing extends from a central part of the rear axle casing at right angles relative to an extending direction of the rear axle casing. The right motor is provided in a right side of an extreme end of the gear casing, and the left motor is provided in a left side of the extreme end of the gear casing. The right and left motors extend in a vehicle lateral direction. Rotary power from each of the motors is transmitted to an axle which is housed in the rear axle casing through a transmission mechanism housed in the gear casing. As apparent from FIG. 2 in WO 2013/015171 A1, the right and left motors extending straight in the vehicle lateral direction are connected to the rear axle casing which is also extending straight in the vehicle lateral direction, via the gear casing extending in a vehicle fore/aft direction along a vehicle lateral centerline. Thus, the casing structure disclosed in WO 2013/015171 A1 housing the mechanism for transmitting power from the motors to the rear wheels has a significantly complicated configuration, which results in increased costs. Further, the right and left motors are mounted inward of a vehicle frame and a battery is disposed between the right and left motors, which disadvantageously results in unavailability of a large battery.

JP 2008-168869 A (or US 2009/00008391 A1 corresponding thereto) discloses a conventional hybrid lawn mower including a right motor for driving a right rear wheel and a left motor for driving a left rear wheel, which are attached to outer sides of a frame; and an engine and a battery, which are mounted between the right and left motors. The right and left motors are wheel motors each having a rotary axis aligned with a rear wheel axis. In this arrangement, the heavy engine and battery are disposed rearward of the rear wheel axis, which results in poor balance relative to the rear wheel axis. On the other hand, no improvement has been achieved on such a precarious vehicle balance, since each of the right and left motors has a center of gravity thereof substantially on the rear wheel axis.

Under these circumstances, it has been desired that an electric work vehicle, including a right motor for driving a right rear wheel and a left motor for driving a left rear wheel, should improve the vehicle balance and secure a sufficient space for a large battery.

SUMMARY OF THE INVENTION

An electric work vehicle according to the present invention includes a left frame and a right frame spaced apart from each other in a vehicle lateral direction and extending in a vehicle fore/aft direction, a battery assembly mounted between the left frame and the right frame, a rear wheel unit including a left rear wheel mounted outward of the left frame in the vehicle lateral direction, and a right rear wheel mounted outward of the right frame in the vehicle lateral direction. The work vehicle further includes a left motor mounted outward of the left frame in the vehicle lateral direction and forward of an axis of the left rear wheel, the left motor being charged and powered by the battery assembly to transmit rotary driving power to the left rear wheel, and a right motor mounted outward of the right frame in the vehicle lateral direction and forward of an axis of the right rear wheel, the right motor being charged and powered by the battery assembly to transmit rotary driving power to the right rear wheel.

With the above arrangement in which the left motor for driving the left rear wheel and the right motor for driving the right rear wheel are mounted forward of the rear wheel axis, the center of gravity of the vehicle body is positioned forward of the rear wheel axis or near the center of the vehicle. Thus, the arrangement of the right and left motors contributes to improvement of the vehicle balance. Further, the left motor is attached to a left outer side of the left frame and the right motor is attached to a right outer side of the right frame, as a result of which, an extensive space can be secured around the rear wheels between the right and left frames for accommodating a large battery.

When the rotary axis of the motor extends remote from the rear axle axis associated therewith, a motor output shaft should be connected to the rear wheel axle through a transmission. If the transmission cases for housing the transmissions are mounted outward of the right and left frames, a large space would be provided between the right and left frames for accommodating a large component such as a battery without interfering with the transmission cases. In view of this, according to a preferred embodiment of the present invention, a left transmission case is mounted outward of the left frame in the vehicle lateral direction for accommodating a left transmission that reduces and transmits rotary power from an output shaft of the left motor to a left rear axle, and a right transmission case is mounted outward of the right frame in the vehicle lateral direction for accommodating a right transmission that reduces and transmits rotary power from an output shaft of the right motor to a right rear axle.

Other aspects of the present invention, and an advantageous effect or effects resulting therefrom would be apparent by reading the description of the preferred embodiments as follows, with reference to the figures accompanied herewith.

DETAILED DESCRIPTION OF THE PREFERRED EMBODIMENTS

Figure 1:
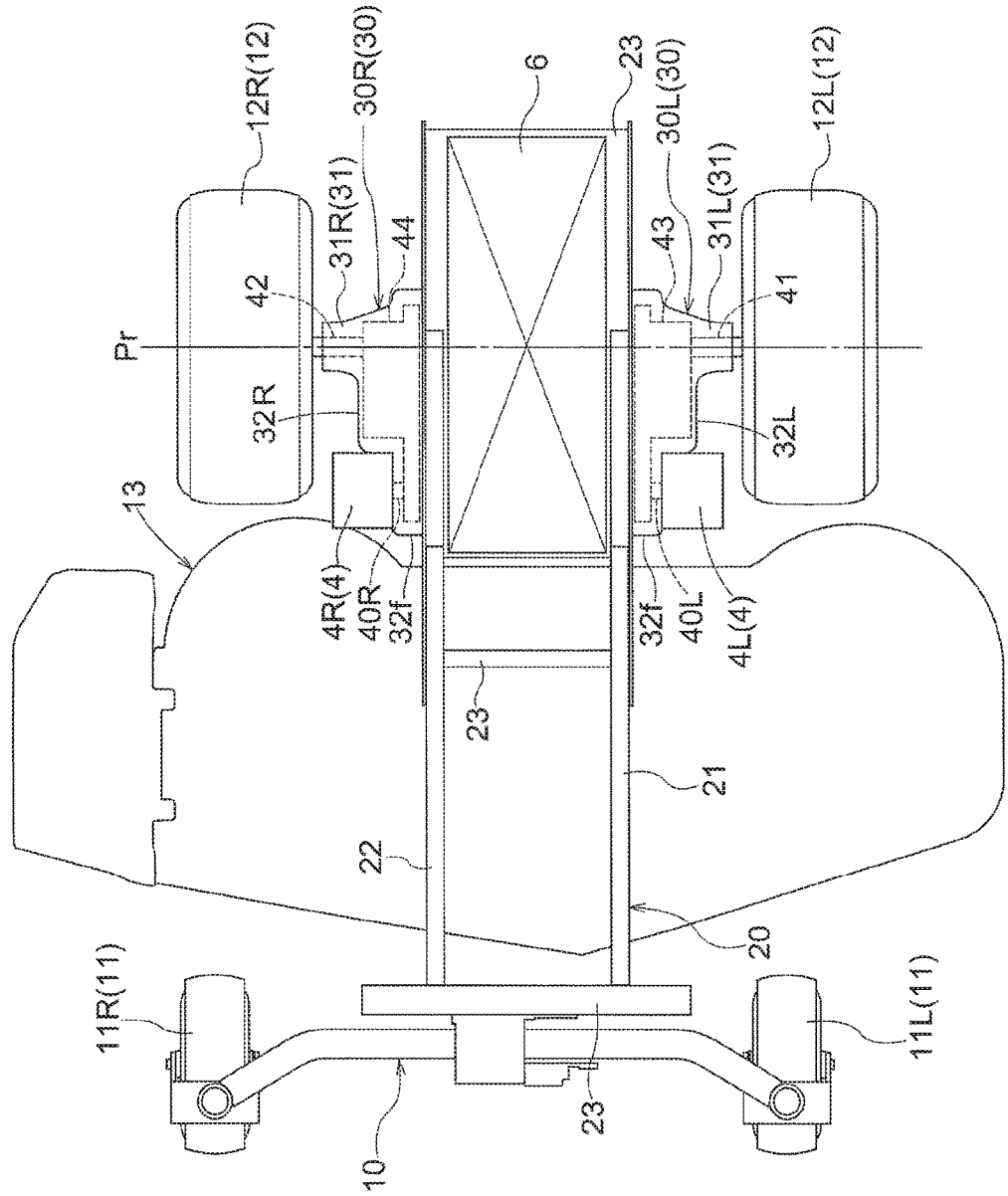
FIG. 1 is a schematic top plan view of an essential part of an electric work vehicle showing a fundamental arrangement of right and left motors mounted on the vehicle.

Prior to detailed description of an electric work vehicle according to the present invention, a fundamental arrangement of electric motors mounted on the electric work vehicle for driving rear wheels will be described first with reference to FIG. 1. In the present description, unless explicitly explained otherwise, a "vehicle fore/aft direction" represents a direction of a vehicle central axis (or vehicle longitudinal axis) extending horizontally along a running direction of the vehicle body. A "vehicle lateral direction" (or simply referred to as a "lateral direction") represents a direction extending horizontally, and perpendicularly to the vehicle central axis. A front (side) represents a forward side in the vehicle fore/aft direction, and a rear (side) represents a rearward side in the vehicle fore/aft direction. The right and left sides are defined with respect to a vehicle forward direction.

The electric work vehicle includes a vehicle body 10 provided with a vehicle frame assembly 20. The vehicle frame assembly 20 includes a left frame 21 and a right frame 22 spaced apart from each other in the vehicle lateral direction and extending in the vehicle fore/aft direction. The vehicle frame assembly 20 also includes at least one cross beam 23 for interconnecting the left frame 21 and the right frame 22. A front wheel unit includes a left front wheel 11L and a right front wheel 11R, which are arranged forward of the vehicle frame assembly 20. A rear wheel unit includes a left rear wheel 12L and a right rear wheel 12R, which are arranged rearward of the vehicle frame assembly 20. The left front wheel 11L and the right front wheel 11R will be collectively referred to as front wheels 11, and the left rear wheel 12L and the right rear wheel 12R will be collectively referred to as rear wheels 12 hereinafter unless the need arises to distinguish the left from the right. A rear axle axis Pr extends in the vehicle lateral direction.

A battery assembly 6 extends substantially horizontally from a rear side to a front side of the rear axle axis Pr between the left frame 21 and the right frame 22.

A left motor 4L for driving the left rear wheel 12L is disposed outward from the left frame 21 in the vehicle lateral direction and forward from an axis of the left rear wheel 12L, i.e., the rear axle axis Pr. A right motor 4R for driving the right rear wheel 12R is disposed outward from the right frame 22 in the vehicle lateral direction and forward from an axis of the right rear wheel 12R, i.e., the rear axle axis Pr. The left motor 4L and the right motor 4R are driven by electric supply from the battery assembly 6. The left motor 4L and the right motor 4R will be collectively referred to as motors 4 hereinafter unless the need arises to distinguish the left from the right.

The motors 4 are arranged forward from the rear axle axis Pr, and thus need transmissions for transmitting driving power from the motors 4 to the rear wheels 12. The left motor 4L and the right motor 4R, which are driven independently of each other, are associated with a left transmission 43 and a right transmission 44, respectively. A left transmission case 30L is disposed outward from the left frame 21 in the vehicle lateral direction for housing the left transmission 43 which reduces and transmits rotary power from an output shaft 40L of the left motor 4L to a left rear axle 41. A right transmission case 30R is disposed outward from the right frame 22 in the vehicle lateral direction for housing the right transmission 44 which reduces and transmits rotary power from an output shaft 40R of the right motor 4R to a right rear axle 42. The motors 4 are desirably speed changeable, and thus the left transmission 43 and the right transmission 44 may dispense with a speed-reduction function (or speed-increase function).

The left transmission 43 is extending along and connected to a left side surface of the left frame 21 extending along the left frame 21. The right transmission 44 is extending along and connected to a right side surface of the right frame 22 extending along the right frame 22. Such an arrangement synergistically increases the rigidity of connection between the left frame 21 and the left transmission 43 and the rigidity of connection between the right frame 22 and the right transmission 44.

With reference to FIG. 1, the left transmission case 30L includes a left axle casing 31L for supporting and housing the left rear axle 41, and a left front casing 32L extending forward from the left axle casing 31L along the left frame 21. The left front casing 32L has a front part 32f disposed between the left motor 4L and the left frame 21. Likewise, the right transmission case 30R includes a right axle casing 31R for supporting and housing the right rear axle 42, and a right front casing 32R extending forward from the right axle casing 31R along the right frame 22. The right front casing 32R has a front part 32f disposed between the right motor 4R and the right frame 22. More particularly, the left motor 4L is fixed to the front part 32f of the left front casing 32L with the output shaft 40L of the left motor 4L protruding into the left front casing 32L in the vehicle lateral direction. Likewise, the right motor 4R is fixed to the front part 32f of the right front casing 32R with the output shaft 40R of the right motor 4R protruding into the right front casing 32R in the vehicle lateral direction. This allows a large part of each of the motors 4 to be exposed outside. As a result, the motors 4 are easily subjected to an air flow directly during travel of the vehicle, and thus satisfactorily cooled.

With the above arrangement of the left transmission case 30L and the right transmission case 30R, power-transmission components are substantially removed from space between the left frame 21 and the right frame 22. Thus, the large battery assembly 6 may be mounted in this space. More specifically, the battery assembly 6 has a rear end positioned rearward from the rear wheels 12 in the vehicle fore/aft direction, and a front end positioned near the left motor 4L and the right motor 4R, preferably forward from the left motor 4L and the right motor 4R, in the vehicle fore/aft direction.

Incidentally, numeral 30 denotes a transmission case unit which is a collective nomination of the left transmission case 30L and the right transmission case 30R; and numeral 31 denotes an axle casing unit which is a collective nomination of the left axle casing 31L and the right axle casing 31R.

Figure 2:
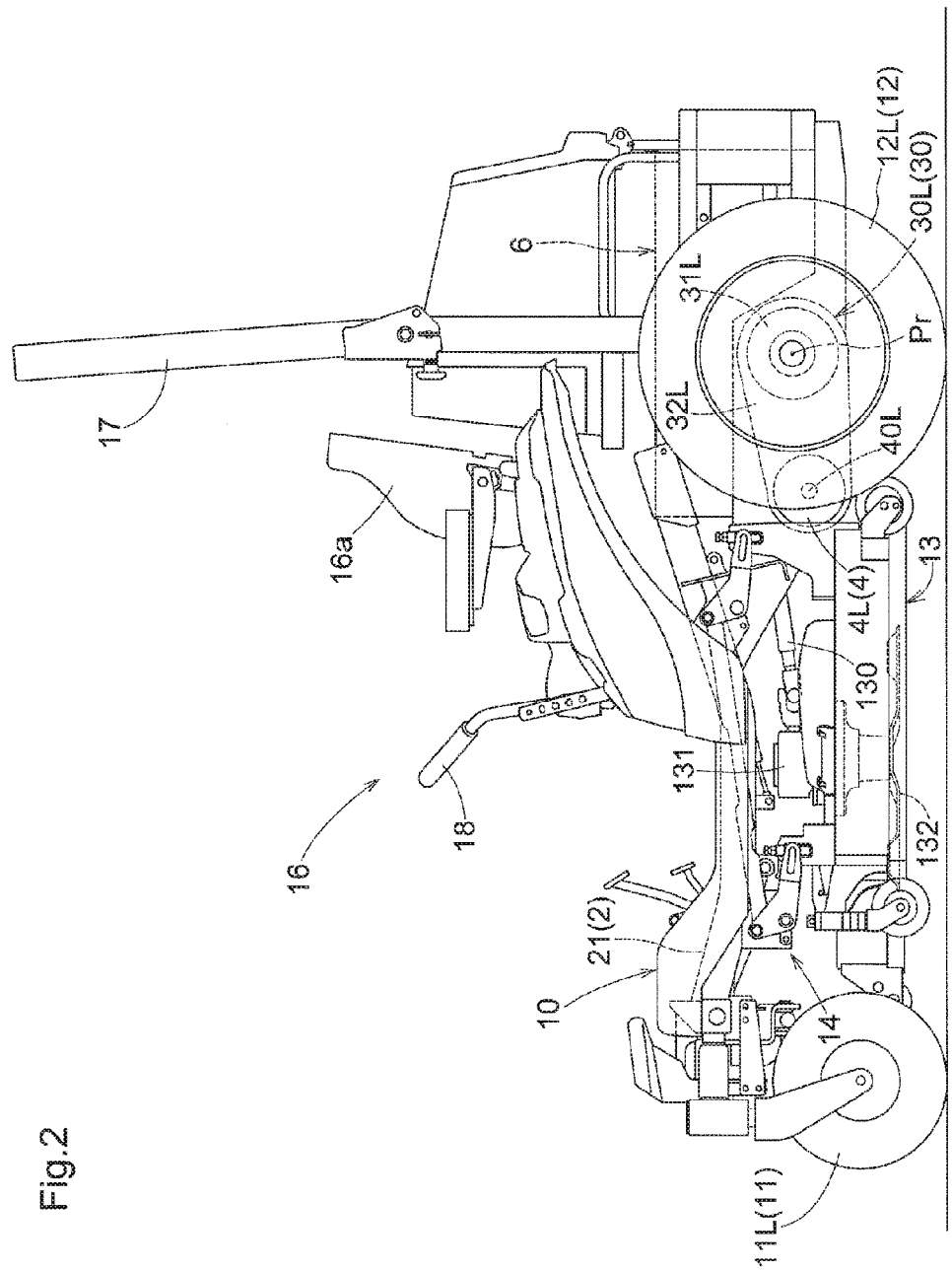
FIG. 2 is a side view of an electric lawn mower.
Figure 3:
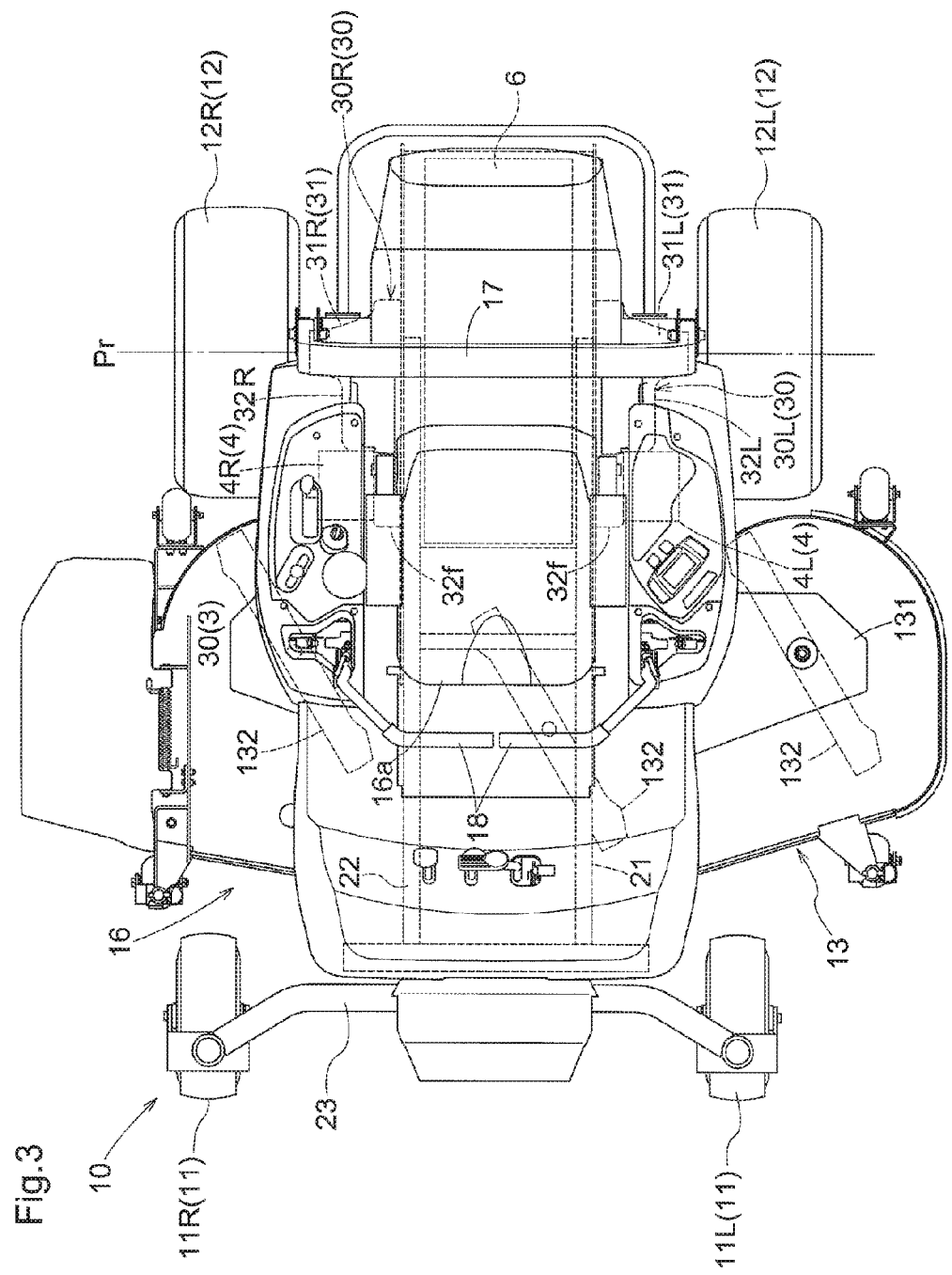
FIG. 3 is a top plan view of the electric lawn mower.
Figure 4:
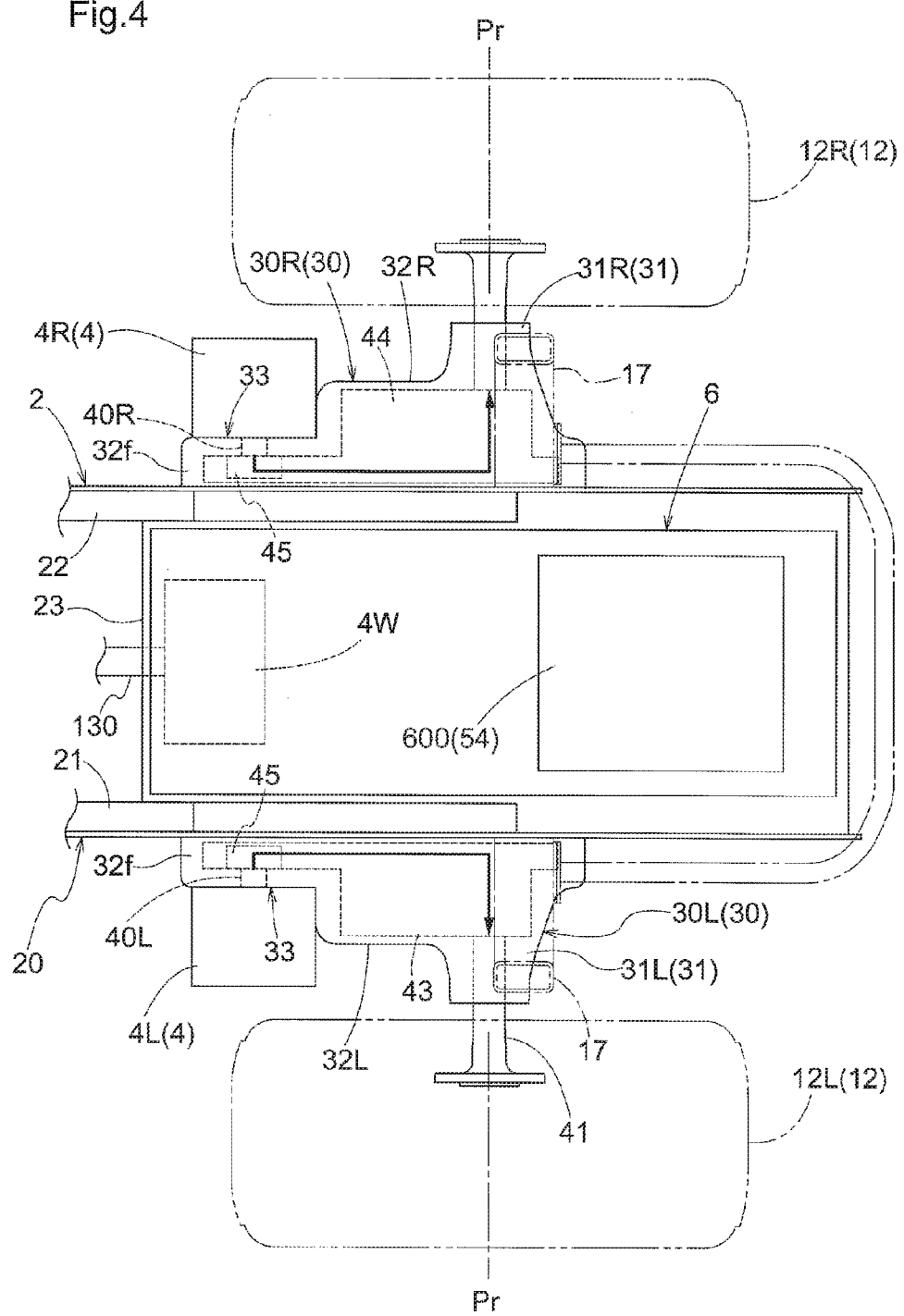
FIG. 4 is a schematic top plan view of a rear part of the electric lawn mower showing relationships between the right/left motors, right/left transmissions and a vehicle frame assembly (right/left frames)

Next, a specific embodiment of the electric work vehicle will be described with reference to the accompanying drawings. FIG. 2 is a side view of an electric lawn mower, which is an example of the electric work vehicle, FIG. 3 is a top plan view of the electric lawn mower, and FIG. 4 is a top plan view of a rear part of the vehicle with components arranged above the battery assembly 6 being omitted for increasing the visibility of the battery assembly 6. With reference to FIGS. 2 to 4, the electric lawn mower (simply referred to as "lawn mower" hereinafter) includes a vehicle body 10 supported on the ground by a pair of right and left front wheels 11 and a pair of right and left rear wheels 12. The pair of right and left rear wheels 12 act as a rotatablydriven rear wheel unit. The vehicle body 10 includes a vehicle frame assembly 20 functioning as a base framework. The vehicle frame assembly 20 is formed of a left frame 21 and a right frame 22. A mower unit 13 is suspended from the vehicle frame assembly 20 via a link mechanism 14 between the front wheels 11 and the rear wheels 12. The mower unit 13 includes a blade transmission mechanism 131, and a blade 132 rotated by the blade transmission mechanism 131. A driver's section 16 is arranged on the vehicle body 10 in a central area thereof in the vehicle fore/aft direction. Thus, a driver's seat 16a is mounted on the vehicle body 10 by a seat support in this central area in the vehicle fore/aft direction.

With reference to FIG. 4, in a rear region of the vehicle frame assembly 20, a left transmission case 30L is attached to a left side surface of the left frame 21, and a right transmission case 30R is attached to a right side surface of the right frame 22. Each of the left transmission case 30L and the right transmission case 30R has a planar attaching part, through which the left transmission case 30L or the right transmission case 30R is attached to the left side surface of the left frame 21 or the right side surface of the right frame 22.

The left transmission case 30L includes a left axle casing 31L and a left front casing 32L. The left axle casing 31L is a tubular element for housing and supporting a left rear axle 41 for the left rear wheel 12L. A rear axle axis Pr also represents a central axis of the left axle casing 31L. The left front casing 32L is a hollow element extending forward from the left axle casing 31L in the vehicle fore/aft direction and perpendicularly to the rear axle axis Pr. The left front casing 32L accommodates a left transmission 43 having a gear transmission. The left front casing 32L has a front part 32f positioned away from the left axle casing 31L and defining an attachment surface 33 to the left motor 4L. A through bore is formed in an outer wall of the front part 32f with the attachment surface 33. An output shaft 40L of the left motor 4L attached to the attachment surface 33 enters the left front casing 32L via the through bore. The lawn mower in the illustrated embodiment further includes an electromagnetic brake 45 provided in the front part 32f for braking the output shaft 40L. The left output shaft 40L extends parallel to the left rear axle 41. A left transmission 43 establishes power transmission between the output shaft 40L and the left rear axle 41. A gap is defined between the left motor 4L and the left axle casing 31L for allowing satisfactory air communication.

Likewise, the right transmission case 30R includes a right axle casing 31R and a right front casing 32R. The right front casing 32R accommodates a right transmission 44, and has a front part 32f defining an attachment surface 33 to the right motor 4R. The right motor 4R is attached to the attachment surface 33. An electromagnetic brake 45 is also provided in the front part 32f of the right front casing 32R for braking an output shaft 40R of the right motor 4R. The right transmission case 30R and the right transmission 44 are arranged in mirror symmetry to the left transmission case 30L and the left transmission 43, and further details thereof are omitted.

FIG. 4 only schematically shows flows of power transmission with arrows, since configurations and structures of the left transmission 43 and the right transmission 44 are well known. The gear transmission may be replaced with a chain electric mechanism or a transmission shaft mechanism.

The left motor 4L and the right motor 4R are driven independently of each other in respective variable speeds. With such an arrangement, both the right and left rear wheels 12 are driven forward at the same or substantially the same speed to produce straight forward drive. On the other hand, both the right and left rear wheels 12 are driven reversely at the same or substantially the same speed to produce straight reverse drive. Further, the right and left rear wheels 12 are driven at different speeds to turn the vehicle body 10 to a desired direction. For example, one of the right and left rear wheels 12 is driven at a lower speed that is approximate to zero and the other of the right and left rear wheels 12 is driven forward or reversely at a higher speed to achieve a sharp turn. Further, the right rear wheel and the left rear wheel are driven in opposite directions to achieve a spin turn about a center between the right and left rear wheels 12.

The pair of right and left front wheels 11 act as caster wheels, which are freely rotatable about a vertical axis to change directions. Thus, the directions of the pair of right and left front wheels 11 are corrected in response to the running direction of the vehicle determined by driving the right and left rear wheels 12.

Change speed operations for the left motor 4L and the right motor 4R are performed by controlling a pair of right and left shift levers 18 which are distributed on opposite sides of a driver's seat 16a as shown in FIGS. 2 and 3. When the shift lever 18 is held at a neutral position in the vehicle fore/aft direction, the associated motor 4 is stopped. When the shift lever 18 is operated forward from the neutral position, the associated motor 4 is driven forward to achieve forward speed change. When the shift lever 18 is operated rearward from the neutral position, the associated motor 4 is driven reversely to achieve reverse speed change.

With reference to FIG. 2, a rollover protection system (ROPS) 17 is provided rearward of a driver's section 16. The ROPS 17 is a U-shaped, arched element having left and right free ends thereof connected to the left frame 21 and the right frame 22, respectively.

With reference to FIG. 4, an implement motor 4W is disposed under the battery assembly 6 in a space between the left frame 21 and the right frame 22. The implement motor 4W transmits driving power to the mower unit 13 acting as a work implement. As understood from FIG. 5, the battery assembly 6 includes a front half that is cut away in a lower part thereof to define a space for receiving the implement motor 4W. A PTO shaft 130 including an output shaft and a relay shaft extending from the implement motor 4W extends forward in the vehicle fore/aft direction to transmit driving power from the implement motor 4W to the blade transmission mechanism 131 for the mower unit 13.

Figure 5:
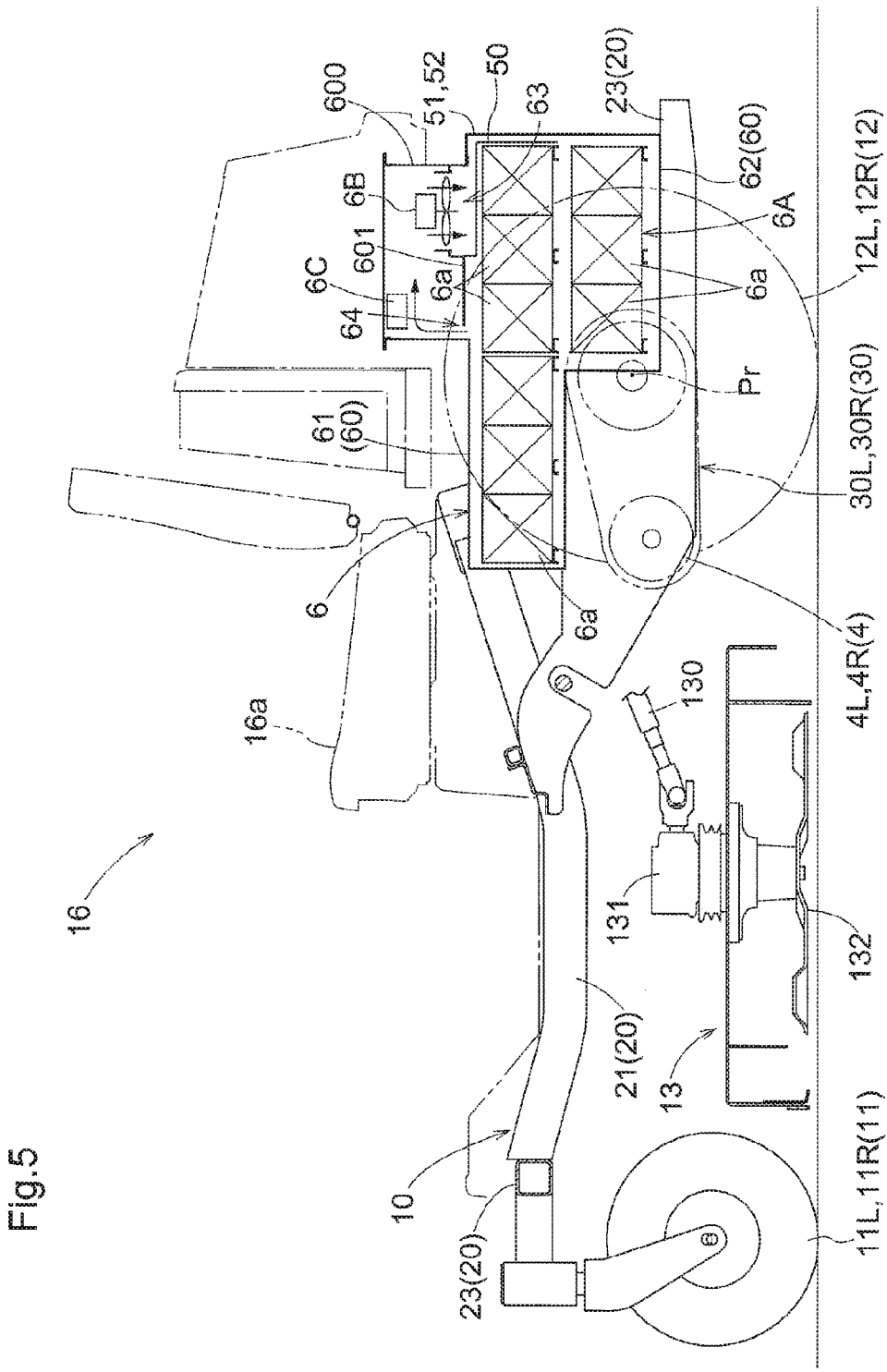
FIG. 5 is a schematic side view of the electric lawn mower showing an arrangement of a battery assembly.
Figure 6:
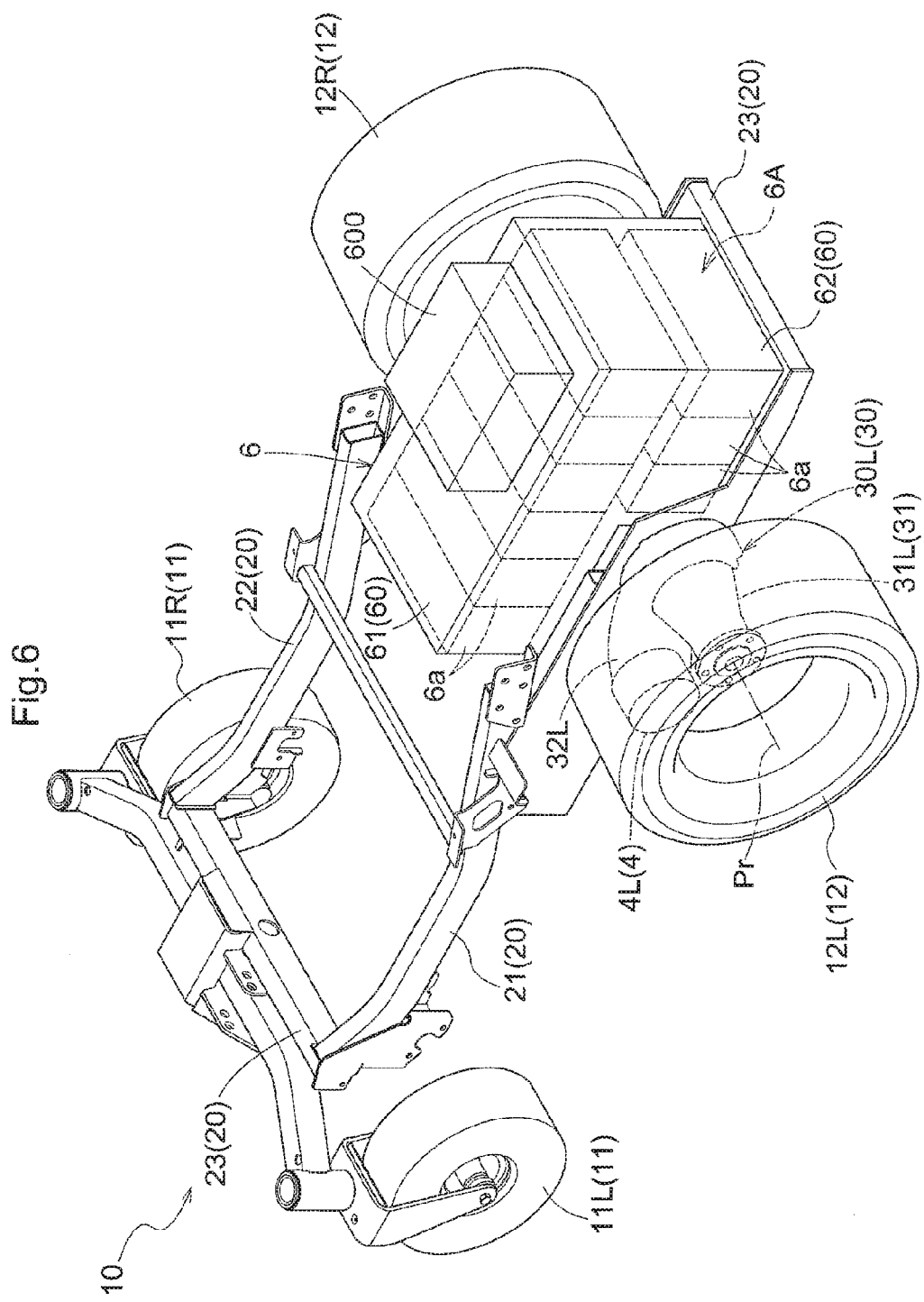
FIG. 6 is a schematic perspective view of primary components of the electric lawn mower showing the arrangement of the battery assembly.

The battery assembly 6 will be described in detail hereinafter with reference to FIGS. 5 and 6, which describe the battery assembly 6 with many components omitted for explanation conveniences. The battery assembly 6 is also referred to as a battery pack, typically including a battery unit 6A housed in a battery case 60. The battery unit 6A includes at least one battery module 6a. The battery case 60 includes an upper casing 61 and a lower casing 62. The upper casing 61 is substantially a rectangle parallelpiped element having a flat configuration with its height being smaller than a lateral width (extending along the vehicle lateral direction) and a longitudinal length (extending along the vehicle fore/aft direction). The lower casing 62 substantially a rectangle parallelpiped element arranged under a rear half of the upper casing 61. The lower casing 62 has a longitudinal length that is smaller than that of the upper casing 61, and a lateral width and a height that are substantially the same as those of the upper casing 61. Thus, the entire battery case 60 is substantially L-shaped in vertical section along the vehicle fore/aft direction, as seen from a lateral side thereof. The battery case 60 is tight sealed sufficient to prevent grass clippings or dust from entering an inner space thereof from outside, but sufficient to allow an air flow from the inner space to outside and vice versa.

The lawn mower in the illustrated embodiment further includes a circulation fan 6B provided above the battery unit 6A for forcibly circulating air in the inner space of the battery case 60. The circulation fan 6B acts as a circulation mechanism for circulating air within the battery case 60. An auxiliary casing 600 protrudes above from a top surface of the upper casing 61 for accommodating the circulation fan 6B. A partition 601 is provided between the auxiliary casing 600 and the upper casing 61. The battery module 6a may include a plurality of lithium-ion battery cells, which are charged and powered by a battery control unit 6C accommodated in the auxiliary casing 600 together with the circulation fan 6B. The circulation fan 6B is an axial flow fan with its blow-off side being oriented to a fan opening 63. The fan opening 63 is formed in the partition 601 to draw air from above and blow it off downward as cooling air. The cooling air from the circulation fan 6B passes through the fan opening 63 to the inner space of the battery case 60 accommodating the battery unit 6A. An air guide 50 is provided to direct cooling air blown from the fan opening 63 to a space defined between the battery unit 6A and panels 52 that cover side surfaces of a battery retainer framework 51. A return opening 64 is formed in the partition 601 as a through hole, in addition to the fan opening 63, around the battery control unit 6C. The cooling air having passed through the battery unit 6A returns to the inner space of the auxiliary casing 600 through the return opening 64. Such air circulation achieves a uniform temperature distribution in the inner space of the battery case 60, which results in reduced variations in temperature among the battery cells forming the battery modules 6a.

Alternative Embodiment

[1] In the foregoing embodiment, the two electromagnetic brakes 45 are mounted between the left motor 4L and the left transmission 43, and between the right motor 4R and the right transmission 44, respectively. Instead thereof, the electromagnetic brakes 45 may be mounted on a left outer side of the left motor 4L and a right outer side of the right motor 4R, respectively.

[2] In the foregoing embodiment, the lawn mower is described as an example of the electric work vehicle. The present invention is also applicable to an agricultural work vehicle such as a rice transplanter, a combine harvester or a tractor, or a construction machine such as a backhoe or a bucket loader.

What is claimed is:

1. An electric work vehicle comprising:
   a left frame and a right frame spaced apart from each other in a vehicle lateral direction and extending in a vehicle fore/aft direction;
   a battery assembly mounted between the left frame and the right frame;
   a rear wheel unit including a left rear wheel mounted outward of the left frame in the vehicle lateral direction, and a right rear wheel mounted outward of the right frame in the vehicle lateral direction;
   a left motor mounted outward of the left frame in the vehicle lateral direction and forward of an axis of the left rear wheel, the left motor being charged and powered by the battery assembly to transmit rotary driving power to the left rear wheel;
   a right motor mounted outward of the right frame in the vehicle lateral direction and forward of an axis of the right rear wheel, the right motor being charged and powered by the battery assembly to transmit rotary driving power to the right rear wheel;
   a left transmission case mounted outward of the left frame in the vehicle lateral direction, the left transmission case accommodating a left transmission for reducing and transmitting rotary power from an output shaft of the left motor to a left rear axle; and
   a right transmission case mounted outward of the right frame in the vehicle lateral direction, the right transmission case accommodating a right transmission for reducing and transmitting rotary power from an output shaft of the right motor to a right rear axle.

2. The electric work vehicle according to claim 1, wherein the left transmission case is connected to the left frame along the vehicle fore/aft direction, and
   the right transmission case is connected to the right frame along the vehicle fore/aft direction.

3. The electric work vehicle according to claim 1, wherein the left transmission case comprises a left axle casing supporting and housing the left rear axle, and a left front casing extending forward from the left axle casing along the left frame, the left front casing having a front part thereof disposed between the left motor and the left frame, and
   wherein the right transmission case comprises a right axle casing supporting and housing the right rear axle, and a right front casing extending forward from the right axle casing along the right frame, the right front casing having a front part thereof disposed between the right motor and the right frame.

4. The electric work vehicle according to claim 3, wherein the left motor is fixed to the front part of the left front casing with an output shaft of the left motor entering the left front casing in the vehicle lateral direction, and
   wherein the right motor is fixed to the front part of the right front casing with an output shaft of the right motor entering the right front casing in the vehicle lateral direction.

5. The electric work vehicle according to claim 1, wherein the battery assembly includes a rear end positioned rearward of the rear wheel unit in the vehicle fore/aft direction, and a front end positioned near the left motor and the right motor in the vehicle fore/aft direction.

6. The electric work vehicle according to claim 5, wherein the front end of the battery assembly is positioned forward of the left motor and the right motor.

7. The electric work vehicle according to claim 1, further comprising:
   a front wheel unit including a left front wheel mounted outward of the left frame in the vehicle lateral direction, and a right front wheel mounted outward of the right frame in the vehicle lateral direction; and
   a mower unit mounted forward of the battery assembly between the front wheel unit and the rear wheel unit.

8. The electric work vehicle according to claim 7, further comprising an implement motor mounted under a front end part of the battery assembly for transmitting rotary power to the mower unit.

9. The electric work vehicle according to claim 2, wherein the left transmission case comprises a left axle casing supporting and housing the left rear axle, and a left front casing extending forward from the left axle casing along the left frame, the left front casing having a front part thereof disposed between the left motor and the left frame, and wherein the right transmission case comprises a right axle casing supporting and housing the right rear axle, and a right front casing extending forward from the right axle casing along the right frame, the right front casing having a front part thereof disposed between the right motor and the right frame.

10. The electric work vehicle according to claim 9, wherein the left motor is fixed to the front part of the left front casing with an output shaft of the left motor entering the left front casing in the vehicle lateral direction, and wherein the right motor is fixed to the front part of the right front casing with an output shaft of the right motor entering the right front casing in the vehicle lateral direction.

11. The electric work vehicle according to claim 1, wherein the battery assembly includes a rear end positioned rearward of the rear wheel unit in the vehicle fore/aft direction, and a front end positioned near the left motor and the right motor in the vehicle fore/aft direction.

12. The electric work vehicle according to claim 11, wherein the front end of the battery assembly is positioned forward of the left motor and the right motor.

13. The electric work vehicle according to claim 2, wherein the battery assembly includes a rear end positioned rearward of the rear wheel unit in the vehicle fore/aft direction, and a front end positioned near the left motor and the right motor in the vehicle fore/aft direction.

14. The electric work vehicle according to claim 13, wherein the front end of the battery assembly is positioned forward of the left motor and the right motor.

15. The electric work vehicle according to claim 1, further comprising:

a front wheel unit including a left front wheel mounted outward of the left frame in the vehicle lateral direction, and a right front wheel mounted outward of the right frame in the vehicle lateral direction; and a mower unit mounted forward of the battery assembly between the front wheel unit and the rear wheel unit.

16. The electric work vehicle according to claim 15, further comprising an implement motor mounted under a front end part of the battery assembly for transmitting rotary power to the mower unit.

17. The electric work vehicle according to claim 2, further comprising:

a front wheel unit including a left front wheel mounted outward of the left frame in the vehicle lateral direction, and a right front wheel mounted outward of the right frame in the vehicle lateral direction; and a mower unit mounted forward of the battery assembly between the front wheel unit and the rear wheel unit.

18. The electric work vehicle according to claim 17, further comprising an implement motor mounted under a front end part of the battery assembly for transmitting rotary power to the mower unit.

\* \* \* \* \*